US011114963B2

(12) United States Patent
Ganireddy et al.

(10) Patent No.: US 11,114,963 B2
(45) Date of Patent: Sep. 7, 2021

(54) METHOD AND SYSTEM FOR ENHANCING ELECTRICAL POWER PRODUCTION BY A POWER GENERATION SYSTEM BY CONTROLLING SWITCHES TO PLACE A ROTOR-SIDE CONVERTER IN PARALLEL WITH A LINE-SIDE CONVERTER

(71) Applicant: General Electric Company, Schenectady, NY (US)

(72) Inventors: Govardhan Ganireddy, Roanoke, VA (US); Arvind Kumar Tiwari, Bangalore (IN); Yashomani Y Kolhatkar, Bangalore (IN); Anthony Michael Klodowski, Hardy, VA (US); John Leo Bollenbecker, Albany, NY (US); Harold Robert Schnetzka, Simpsonville, SC (US); Robert Gregory Wagoner, Roanoke, VA (US); Veena Padmarao, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/608,949

(22) PCT Filed: Apr. 9, 2018

(86) PCT No.: PCT/US2018/026656
§ 371 (c)(1),
(2) Date: Oct. 28, 2019

(87) PCT Pub. No.: WO2018/200178
PCT Pub. Date: Nov. 1, 2018

(65) Prior Publication Data
US 2020/0059176 A1 Feb. 20, 2020

(30) Foreign Application Priority Data
Apr. 28, 2017 (IN) .............................. 201741015189

(51) Int. Cl.
*H02P 101/15* (2016.01)
*H02P 11/00* (2006.01)
(Continued)

(52) U.S. Cl.
CPC ................ *H02P 9/008* (2013.01); *F03D 9/25* (2016.05); *H02P 9/007* (2013.01); *H02S 10/12* (2014.12); *H02S 10/20* (2014.12); *H02P 2101/15* (2015.01)

(58) Field of Classification Search
CPC ......... F03D 9/25; H02J 2300/40; H02J 3/003; H02J 3/38; H02P 2101/15; H02P 9/007;
(Continued)

(56) References Cited

U.S. PATENT DOCUMENTS 10,186,996 B1 * 1/2019 Holliday ................. H02P 9/107
10,790,770 B2 * 9/2020 Holliday ................. H02P 9/006
(Continued)

FOREIGN PATENT DOCUMENTS

| CN | 103 997 063 A | 8/2014 |
| EP | 2 778 352 A1 | 9/2014 |

(Continued)

OTHER PUBLICATIONS

PCT Search Report and Written Opinion, dated Apr. 9, 2018.
EPO Search Report, dated Nov. 2, 2020.
Indian First Examination Report, dated Nov. 22, 2019.

*Primary Examiner* — Tulsidas C Patel
*Assistant Examiner* — S. Mikailoff
(74) *Attorney, Agent, or Firm* — Dority & Manning, P.A.

(57) ABSTRACT

A power generation system (100, 200, 300, 400) is presented. The power generation system includes a prime mover (102), a doubly-fed induction generator (DFIG) (104) having a rotor winding (126) and a stator winding (122), a rotor-side converter (106), a line-side converter (108), and a (Continued)

secondary power source (110, 401) electrically coupled to a DC-link (128). Additionally, the power generation system includes a control sub-system (112, 212, 312) having a controller, and a plurality of switching elements (130, and 132 or 201). The controller is configured to selectively control switching of one or more switching elements (130, and 132 or 201) based on a value of an operating parameter corresponding to at least one of the prime mover, the DFIG, or the secondary power source to connect the rotor-side converter in parallel to the line-side converter to increase an electrical power production by the power generation system.

8 Claims, 9 Drawing Sheets

(51) Int. Cl.
*H02P 9/00* (2006.01)
*H02S 10/12* (2014.01)
*H02S 10/20* (2014.01)
*F03D 9/25* (2016.01)

(58) Field of Classification Search
CPC .......... H02P 9/008; H02S 10/12; H02S 10/20; Y02E 10/50; Y02E 10/72; Y02E 10/76; Y04S 10/50

USPC ..................................................... 290/44, 55
See application file for complete search history.

(56) References Cited

U.S. PATENT DOCUMENTS

| | | | |
|---|---|---|---|
| 2010/0060000 A1* | 3/2010 | Scholte-Wassink | F03D 7/047 290/44 |
| 2015/0077067 A1 | 3/2015 | Kanjiya et al. | |
| 2015/0084337 A1 | 3/2015 | Wagoner et al. | |
| 2015/0145251 A1* | 5/2015 | Wagoner | F03D 9/10 290/44 |
| 2016/0118786 A1 | 4/2016 | Zhu et al. | |
| 2018/0187653 A1* | 7/2018 | Kolhatkar | H02J 3/383 |
| 2019/0052089 A1* | 2/2019 | Ganireddy | H02P 9/007 |
| 2019/0190425 A1* | 6/2019 | Tiwari | H02P 9/007 |
| 2019/0214824 A1* | 7/2019 | Kolwalkar | H02J 7/35 |
| 2019/0280640 A1* | 9/2019 | Ganireddy | H02J 3/46 |
| 2020/0059176 A1* | 2/2020 | Ganireddy | H02P 9/008 |

FOREIGN PATENT DOCUMENTS

| | | |
|---|---|---|
| KR | 10-2013-0026948 A | 3/2013 |
| KR | 10-2016-0062919 A | 6/2016 |

\* cited by examiner

METHOD AND SYSTEM FOR ENHANCING ELECTRICAL POWER PRODUCTION BY A POWER GENERATION SYSTEM BY CONTROLLING SWITCHES TO PLACE A ROTOR-SIDE CONVERTER IN PARALLEL WITH A LINE-SIDE CONVERTER

BACKGROUND

Embodiments of the present specification generally relate to a power generation system and in particular, to method and system for enhancing energy production by the power generation system.

Some currently available hybrid power generation systems employ a doubly-fed induction generator (DFIG), power sources such as a prime mover (e.g., wind turbine) and an auxiliary power source (e.g., photovoltaic (PV) power source). In some configurations of a hybrid power generation system, the secondary power source is coupled to the DFIG via one or more power converter(s). During operation of the hybrid power generation system, electrical power may be generated by one or both of the DFIG and the secondary power source. The electrical power thus generated may be supplied to electrical loads and/or an electric grid coupled to the hybrid power generation system.

In certain instances, evacuation of the electrical power generated by the auxiliary power source is limited by parameters including but not limited to a rated power of the power converter(s) and/or a slip power of the DFIG. In certain instances, even though the electrical power generated by the DFIG is low and the electrical power generated by the auxiliary power source is within the rated capacity of the converter, only a limited amount of the electrical power generated by the auxiliary power source can be evacuated. Consequently, an excess electrical power generated by the auxiliary power source is curtailed if there is no energy storage capacity in the hybrid power generation system.

Such a limited evacuation of the electrical power generated by the auxiliary power leads to wastage of the electrical power and reduced electrical power production by the hybrid power generation system. Moreover, the limitation imposed by the power converter(s) and the slip power of the DFIG greatly limits integration capacity for the electrical power from the auxiliary power source such as the PV power source. Accordingly, the electrical power generated by the power generation system is limited.

BRIEF DESCRIPTION

In accordance with one embodiment of the present specification, a power generation system is presented. The power generation system includes a prime mover. The power generation system further includes a doubly-fed induction generator (DFIG) operatively coupled to the prime mover, where the DFIG includes a rotor winding and a stator winding. Furthermore, the power generation system includes a rotor-side converter electrically connectible to the rotor winding. Moreover, the power generation system also includes a line-side converter electrically connectible to a point of common coupling (PCC), where the line-side converter and the rotor-side converter are coupled to each other via a direct current (DC) link. Also, the power generation system includes a secondary power source electrically coupled to the DC-link. Additionally, the power generation system includes a control sub-system. The control sub-system includes a plurality of switching elements disposed between the rotor winding of the DFIG and the PCC. Further, the control sub-system includes a controller operatively coupled to the plurality of switching elements and configured to selectively control switching of one or more switching elements of the plurality of switching elements based on a value of an operating parameter corresponding to at least one of the prime mover, the DFIG, or the secondary power source to connect the rotor-side converter in parallel to the line-side converter to increase an electrical power production by the power generation system.

In accordance with one embodiment of the present specification, a control sub-system for operating a power generation system is presented. The power generation system includes a prime mover, a line-side converter, a rotor-side converter, and a DFIG mechanically coupled to the prime mover, wherein the DFIG includes a rotor winding and a stator winding, and where the power generation system further includes a secondary power source coupled to a DC-link disposed between the line-side converter and the rotor-side converter. The control sub-system includes a plurality of switching elements coupled between the rotor winding and a PCC to selectively connect the rotor-side converter in parallel with the line-side converter to increase an electrical power production by the power generation system.

In accordance with one embodiment of the present specification, a power generation system is presented. The power generation system includes a wind turbine. The power generation system further includes a DFIG operatively coupled to the wind turbine, where the DFIG includes a rotor winding and a stator winding. Furthermore, the power generation system includes a rotor-side converter electrically connectible to the rotor winding. Moreover, the power generation system also includes a line-side converter electrically connectible to a PCC, where the line-side converter and the rotor-side converter are coupled to each other via a DC-link. Also, the power generation system includes a photovoltaic power source electrically coupled to the DC-link. Additionally, the power generation system includes a control sub-system. The control sub-system includes a plurality of switching elements disposed between the rotor winding of the DFIG and the PCC. Further, the control sub-system includes a controller operatively coupled to the plurality of switching elements and configured to selectively control switching of one or more switching elements of the plurality of switching elements based on a value of a wind speed corresponding to the wind turbine to connect the rotor-side converter in parallel to the line-side converter to increase an electrical power production by the power generation system.

In accordance with one embodiment of the present specification, a method for enhancing electrical power production by a power generation system is presented. The power generation system includes a prime mover, a DFIG operatively coupled to the prime mover, a rotor-side converter electrically connectible to a rotor winding of the DFIG, a line-side converter electrically connectible to a PCC, and where the line-side converter and the rotor-side converter are coupled to each other via a DC-link, and a secondary power source electrically coupled to the DC-link. The method includes determining, by a controller, a value of an operating parameter corresponding to at least one of the prime mover, the DFIG, or the secondary power source. The method further includes selectively controlling, by the controller, switching of one or more switching elements of a plurality of switching elements based on the value of the operating parameter to connect the rotor-side converter in parallel to the line-side converter to increase an electrical power production by the power generation system, where the controller is coupled to the plurality of switching elements, and where the plurality of switching elements are disposed between the rotor winding and the PCC.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

In accordance with some embodiments of the present specification, a power generation system is presented. The power generation system includes a prime mover. The power generation system further includes a doubly-fed induction generator (DFIG) operatively coupled to the prime mover, where the DFIG includes a rotor winding and a stator winding. Furthermore, the power generation system includes a rotor-side converter electrically connectible to the rotor winding. Moreover, the power generation system also includes a line-side converter electrically connectible to a point of common coupling (PCC), where the line-side converter and the rotor-side converter are coupled to each other via a direct current (DC) link. Also, the power generation system includes a secondary power source electrically coupled to the DC-link. Additionally, the power generation system includes a control sub-system. The control sub-system includes a plurality of switching elements disposed between the rotor winding of the DFIG and the PCC. Further, the control sub-system includes a controller operatively coupled to the plurality of switching elements and configured to selectively control switching of one or more switching elements of the plurality of switching elements based on a value of an operating parameter corresponding to at least one of the prime mover, the DFIG, or the secondary power source to connect the rotor-side converter in parallel to the line-side converter to increase an electrical power production by the power generation system. In accordance with some embodiments of the present specification, the control sub-system and method for enhancing electrical power production by the power generation system are also presented.

Figure 1:
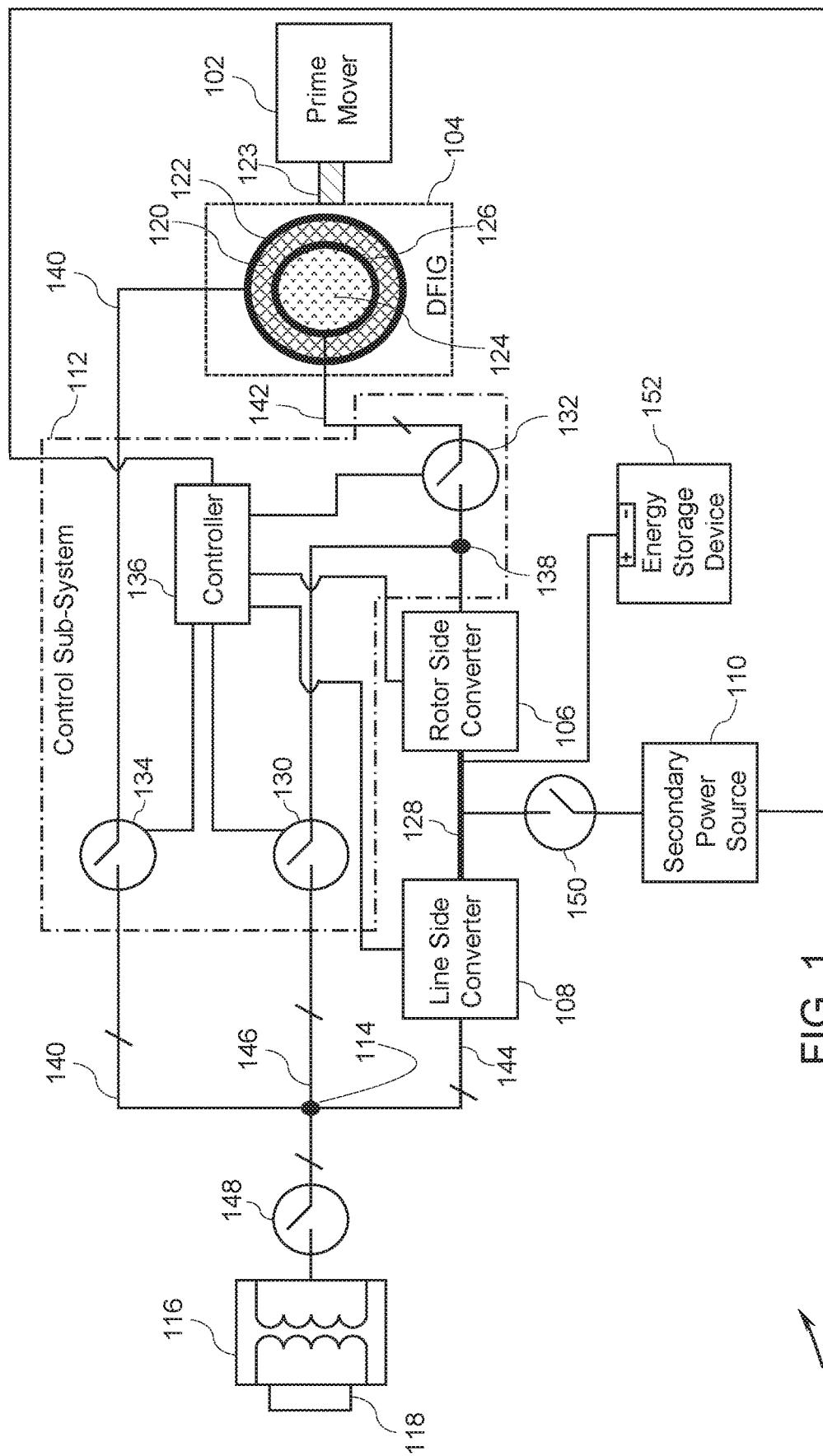
FIG. 1 is a block diagram representation of a power generation system, in accordance with one embodiment of the present specification.

FIG. 1 is a block diagram representation of a power generation system (100) in accordance with one embodiment of the present specification. In some embodiments, the power generation system (100) includes a prime mover (102), a doubly-fed induction generator (DFIG) 104, a rotor-side converter (106), a line-side converter (108), a secondary power source (110), and a control sub-system (112). The DFIG (104) is operatively coupled to the prime mover (102). The rotor-side converter (106) is disposed between the line-side converter (108) and the DFIG (104). The line-side converter (108) and the DFIG (104) are also coupled to a point of common coupling (PCC) (114) as shown in FIG. 1. The line-side converter (108) is coupled to the PCC (114) via a link (144). The stator winding (122) of the DFIG (104) is coupled to the PCC (114) via a link (140). Each of the links (140, 144) may be a three-phase electrical link. In some embodiments, the power generation system (100) may also include a transformer (116) coupled to the PCC (114). The power generation system (100) may be coupled to an electric grid (not shown) or an electric load via the transformer (116). In some embodiments, the PCC (114) may be coupled to the transformer (116) via a switching element (148).

The power generation system (100) may be configured to generate an alternating current (AC) electrical power and supply the AC electrical power from an output power port (118) of the power generation system (100). The AC electrical power at the output power port (118) may be single phase or multi-phase such as three-phase electrical power. The control sub-system (112) may be operatively coupled in the power generation system (100) to enhance the electrical power generation by the power generation system (100). In certain embodiments, the control sub-system (112) may control the electrical power generation by the power generation system (100) such that predefined Balance of Plant (BoP) limits of the transformer (116) are not violated. The BoP limits include at least one of a maximum active power limit of the transformer (116), a maximum apparent power limit of the transformer (116), a maximum apparent current limit of the transformer (116), a maximum temperature limit of the transformer (116).

The prime mover (102) is equivalent to any system that may aid in imparting a rotational motion to rotary element (e.g., a rotor) of the DFIG (104). Non-limiting examples of the prime mover (102) may include a wind turbine (see FIG.

4), a tidal turbine, a hydro turbine, an engine that may be operable at variable speeds, a gas turbine, a compressor, or combinations thereof.

The DFIG (104) includes a stator (120), a stator winding (122) wound on the stator (120), a rotor (124), and a rotor winding (126) wound on the rotor (124). In some embodiments, both the stator winding (122) and the rotor winding (126) may be multi-phase winding such as a three-phase winding. The DFIG (104) is mechanically coupled to the prime mover (102). For example, the rotor (124) of the DFIG (104) is mechanically coupled to a rotary element of the prime mover (102) via a shaft (123) such that rotations of the rotary element of the prime mover (102) cause rotations of the rotor (124) of the DFIG (104).

The rotor (124) of the DFIG (104) is operated at a rotational speed which may be a synchronous speed, a sub-synchronous speed, or a super-synchronous speed depending on the rotational speed of the rotary element of the prime mover (102). In one example, the synchronous speed of the rotor (124) may be defined using equation (1).

$$N_s = \frac{120 * f}{p} \quad (1)$$

In equation (1), $N_s$ represents the synchronous speed of the rotor (124), p represents a number of poles in the rotor (124), and f represents a frequency of grid voltage. Accordingly, a sub-synchronous speed of the rotor (124) may be defined as any speed that is lower than the synchronous speed of the rotor (124). Similarly, a super-synchronous speed of the rotor (124) may be defined as any speed that is higher than the synchronous speed of the rotor (124).

During operation, the DFIG (104) is configured to generate electrical power at the stator winding (122) depending on the rotational speed of the rotor (124). The electrical power that is generated at the stator winding (122) is hereinafter alternatively referred to as a "stator power" ($P_{Stator}$). Further, the DFIG (104) is configured to generate or absorb electrical power at the rotor winding (126) depending on the rotational speed of the rotor (124). For example, the DFIG (104) is configured to generate electrical power at the rotor winding (126) when the rotor (124) is operated at a super-synchronous speed. The DFIG (104) is configured to absorb the electrical power at the rotor winding (126) when the rotor (124) is operated at a sub-synchronous speed. The electrical power that is generated or absorbed at the rotor winding (126) is hereinafter alternatively referred to as a "slip power." The magnitude of the slip power ($P_{Slip}$) is dependent on a slip value of the DFIG (104). In one embodiment, the slip value S may be determined using equation (2).

$$S = \frac{N_s - N_r}{N_s} \quad (2)$$

where $N_s$ represents the synchronous speed of the rotor (124) and $N_r$ represents revolutions per minute (rpm) of the rotor (124).

The rotor-side converter (106) is electrically coupled to the rotor winding (126) of the DFIG (104). In the embodiment of FIG. 1, the rotor-side converter (106) is electrically coupled to the rotor winding (126) via the control sub-system (112) along a link (142). The link (142) may be a three-phase electrical link. The line-side converter (108) is electrically coupled to the PCC (114), either directly or via a transformer (not shown). The rotor-side converter (106) and the line-side converter (108) are electrically coupled to each other via a DC-link (128). The DC-link (128) may include at least two conductors (not shown)—one maintained at a positive potential and another maintained at a negative potential. The DC-link (128) may also include a DC-link capacitor (not shown) electrically coupled between two conductors of the DC-link (128). The rotor-side converter (106) may be an AC-DC converter and configured to convert an AC power into a DC power. In another embodiment, the rotor-side converter (106) may be a DC-AC converter. The line-side converter (108) may be a DC-AC converter and configured to convert the DC power into an AC power. In another embodiment, the line-side converter (108) may be a AC-DC converter.

Further, the stator winding (122) is coupled to the PCC (114) via the control sub-system (112) to supply the stator power ($P_{Stator}$), in some embodiments. In some embodiments, the stator winding (122) is coupled to the PCC (114) via a transformer (not shown). When the rotor (124) is operated at a super-synchronous speed, the slip power ($P_{Slip}$) is supplied to the PCC (114) via the rotor-side converter (106) and the line-side converter (108).

Moreover, the power generation system (100) also includes the secondary power source (110) that is coupled to the DC-link (128). In some embodiments, the secondary power source (110) may be coupled to the DC-link (128) via a switching element (150). The term "secondary power source" as used herein refers to a power source that is capable of generating and/or supplying a secondary power ($P_{Secondary}$) such as a DC power to the DC-link (128). Non-limiting examples of secondary power source (110) may include a photovoltaic (PV) power source, a battery, a fuel cell, a renewable energy based power generator, a non-renewable energy based power generator, or combinations thereof. In some embodiments, the secondary power source (110) may be configured to supply a secondary electrical power to the DC-link (128). In certain embodiments, the secondary power source (110) may include a DC-DC converter (not shown) to control supply of the secondary electrical power to the DC-link (128).

In some embodiments, the power generation system (100) also includes an energy storage device (152). The energy storage device (152) may include one or more batteries, capacitors, or a combination thereof. The energy storage device (152) may be coupled to the DC-link (128) and configured to store the power available on the DC-link (128) or supply power to the DC-link (128) when required.

Furthermore, the power generation system (100) also includes a control sub-system (112) (shown using a dashed region) for controlling electrical power production by the power generation system (100). More particularly, the control sub-system (112) is configured to operate the power generation system (100) such that the electrical power production by the power generation system (100) is enhanced.

The control sub-system (112) includes a plurality of switching elements disposed between the rotor winding (126) of the DFIG (104) and the PCC (114), as shown in FIG. 1. More particularly, the plurality of switching elements connected between the rotor winding (126) of the DFIG (104) and the PCC (114) includes a first switching element (130) and a second switching element (132). The first switching element (130) is coupled between an interconnection terminal (138) and the PCC (114) along a link (146), and where the interconnection terminal (138) is located between the rotor-side converter (106) and the rotor winding (126). The link (146) is a three-phase electrical link. Further, the second switching element (132) is coupled between the interconnection terminal (138) and the rotor winding (126) of the DFIG (104), as shown in FIG. 1. Moreover, in certain embodiments, the control sub-system (112) may also include a third switching element (134) coupled between the stator winding (122) of the DFIG (104) and the PCC (114). Although the control sub-system (112) is shown as having three switching elements (130-134), a control sub-system (112) with fewer or greater number of switching elements is also contemplated.

The switching elements (130-134, 148 and 150) may be capable of being controlled electronically. In some embodiments, the switching elements (130-134, 148 and 150) may be semiconductor switches. Non-limiting examples of such semiconductor switches may include transistors, gate commutated thyristors, field effect transistors, insulated gate bipolar transistors, gate turn-off thyristors, static induction transistors, static induction thyristors, or combinations thereof. Moreover, materials used to form the semiconductor switch may include, but are not limited to, silicon (Si), germanium (Ge), silicon carbide (SiC), gallium nitride (GaN), gallium arsenide (GaAs) or combinations thereof.

In certain embodiments, the plurality of switching elements disposed between the rotor winding (126) of the DFIG (104) and the PCC (114) may further include one or more switches (not shown) disposed in the DC-link (128). For example, one switch may be disposed along the conductor maintained at a positive potential and one switch may be disposed along the conductor maintained at a positive potential. The switches disposed in the DC-link (128) may be controlled to disconnect the rotor-side converter (106) from the line-side converter (108) thereby discontinuing the DC-link (128) and to connect the secondary power source (110) to both the rotor-side converter (106) and the line-side converter (108). Accordingly, the secondary electrical power from the secondary power source may be parallelly supplied to both the rotor-side converter (106) and the line-side converter (108). Consequently, the secondary electrical power may be supplied to the PCC (114) through both the rotor-side converter (when the first switching element (130) is operated in a conducting state) and the line-side converter (108). Moreover, when the DC-link (128) is discontinued via the switches disposed in the DC-link (128), in certain embodiments, electrical excitation (i.e., current/power) to the rotor winding (126) may be supplied via the rotor-side converter (106) and the second switching element (132). In such configuration, the rotor-side converter (106) generates such electrical excitation from the secondary electrical power received from the secondary power source (110).

The control sub-system (112) also includes a controller (136). The controller (136) may be operatively coupled to the switching elements (130-134) and configured to control switching of the switching elements (130-134). Although not shown in FIG. 1, in some embodiments, the controller (136) may also be operatively coupled to the switching elements (148, 150) and configured to control switching of the switching elements (130-134). In some embodiments, the controller (136) may also be operatively coupled to the rotor-side converter (106), the line-side converter (108), and the secondary power source (110) to control functionalities of the rotor-side converter (106), the line-side converter (108), and the secondary power source (110) for controlling flow of electrical power therethrough. In some embodiments, the controller (136) may also be coupled to another supervisory controller (not shown) and configured to control operations of one or more of the switching elements (130-134, 148, 150) the rotor-side converter (106) and the line-side converter (108) based on control commands/set-points received from the supervisory controller. In some embodiments, the controller (136) may include a specially programmed general purpose computer, an electronic processor such as a microprocessor, a digital signal processor, and/or a microcontroller. Further, the controller (136) may include input/output ports, and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor may be a single-core type or multi-core type. Alternatively, the controller (136) may be implemented as hardware elements such as circuit boards with processors or as software running on a processor such as a personal computer (PC), or a microcontroller.

In some embodiments, the controller (136) may be configured to determine a value of an operating parameter corresponding to the DFIG (104) and/or the prime mover (102). Non-limiting examples of the operating parameter may include a wind speed, an operating speed of the prime mover (102), an operating speed of a rotor (124) of the DFIG (104), a level of voltage at the rotor winding (i.e., magnitude of the slip power ($P_{Slip}$)), a level of voltage at the stator winding (i.e., magnitude of the stator power ($P_{Stator}$)), a level of a total power generated by the DFIG (104), a DFIG output power metric (described later) corresponding to the DFIG (104) for a predetermined future time duration, a secondary power metric (described later) corresponding to the secondary power source (110) for the predetermined future time duration.

Moreover, the controller (136) may reconfigure the power generation system (100) based at least on the value of the operating parameter by controlling switching of one or more of a plurality of switching elements (130, 132) to increase electrical power production by the power generation system (100). In certain embodiments, the controller (136) is configured to control switching of at least one of the plurality switching elements (130, 132) or the third switching element (134) based on the value of an operating parameter to connect the rotor-side converter (106) in parallel to the line-side converter (108) to increase an electrical power production by the power generation system (100). More particularly, the controller (136) is configured to send control signals to at least one of the plurality switching elements (130, 132) or the third switching element (134) to operate at least one of the plurality switching elements (130, 132) or the third switching element (134) in a conducting state or a non-conducting state. Further details of reconfiguring the power generation system (100) is described in conjunction with FIGS. 5, 6, 8, and 9.

Figure 2:
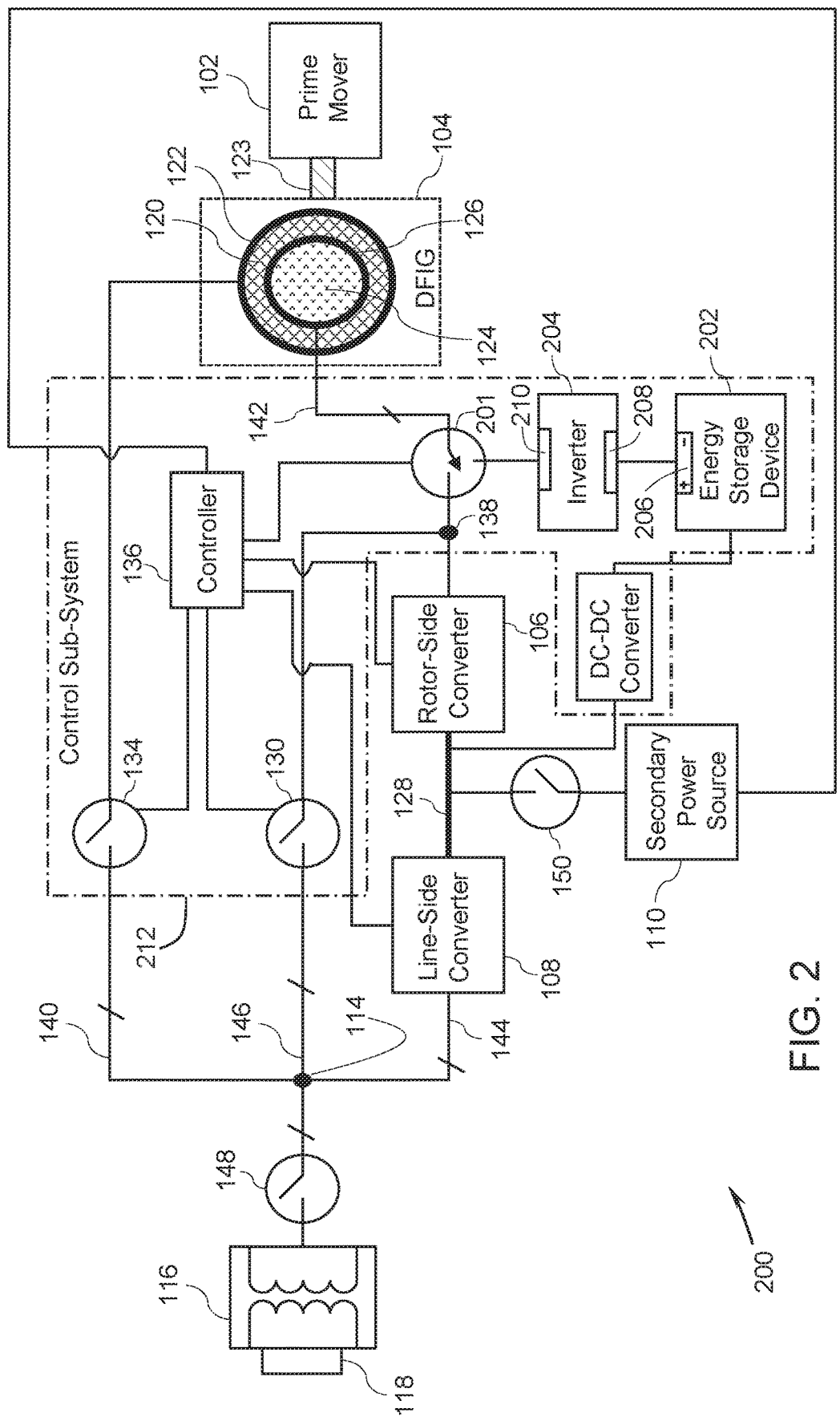
FIG. 2 is a block diagram representation of another power generation system, in accordance with one embodiment of the present specification.

FIG. 2 is a block diagram representation of another power generation system (200), in accordance with one embodiment of the present specification. The power generation system (200) of FIG. 2 may be representative of one embodiment of the power generation system (100) of FIG. 1 and include some similar components as used in FIG. 1. The power generation system (200) includes the prime mover (102), the DFIG (104), the rotor-side converter (106), the line-side converter (108), the secondary power source (110), and a control sub-system (212) interconnected as shown in FIG. 2.

The control sub-system (212) of FIG. 2 is representative of one embodiment of the control sub-system (112) of FIG. 1. The control sub-system (212) includes a plurality of switching element (130, 201) and the third switching element (134) in comparison to the control sub-system (112) of FIG. 1, the control sub-system (212) of FIG. 2 additionally includes an energy storage device (202) and an inverter (204). In some embodiments, the control sub-system (212) may also include a DC-DC converter (labeled in FIG. 2) coupled between the DC-link (128) and the energy storage device (202). Moreover, in the embodiment of FIG. 2, the switching element (201) may be a two-way switch.

The energy storage device (202) may include one or more batteries, capacitors, or a combination thereof. In some embodiments, the energy storage device (202) may be electrically coupled to the inverter (204). More particularly, an output port (206) of the energy storage device (202) is coupled to an input port (208) of the inverter (204). The inverter (204) may receive a DC power from the output port (206) of the energy storage device (202). In some embodiments, the inverter (204) is a DC to AC converter and configured to convert an input DC power into an output AC power at the output port (210) of the inverter (204). The output port (210) of the inverter (204) is coupled to the switching element (201) as shown in FIG. 2.

The controller (136) of the control sub-system (212) is coupled to the switching elements (130, 201). Moreover, the controller (136) may reconfigure the power generation system (200) based at least on the value of the operating parameter corresponding to the DFIG (104), the prime mover (102), and/or the secondary power source (110) to increase electrical power production by the power generation system (200). More particularly, the controller (136) is configured to control switching of the switching elements (130 and 201) such that overall electrical power production by the power generation system (200) is increased. The controller (136) is configured to send control signals to the first switching element (130) to operate the first switching element (130) in a conducting state or a non-conducting state. Moreover, the controller (136) is configured to send control signals to the second switching element (201) to operate the second switching element (201) in an internal excitation state or in an external excitation state. In the internal excitation state the second switching element (201) enables electrical connection between the rotor-side converter (106) and the rotor winding (126). In the external excitation state the second switching element (201) enables electrical connection between the output port (210) of the inverter (204) and the rotor winding (126). Further details of reconfiguring the power generation system (200) is described in conjunction with FIGS. 5, 7, 8, and 9.

In some embodiments, the controller (136) may also be configured to control the operation of the DC-DC converter (214) to facilitate charging of the energy storage device (202). Therefore, when the DC-DC converter (214) is operational, the energy storage device (202) is charged using the power available on the DC-link (128) via the DC-DC converter (214).

Figure 3:
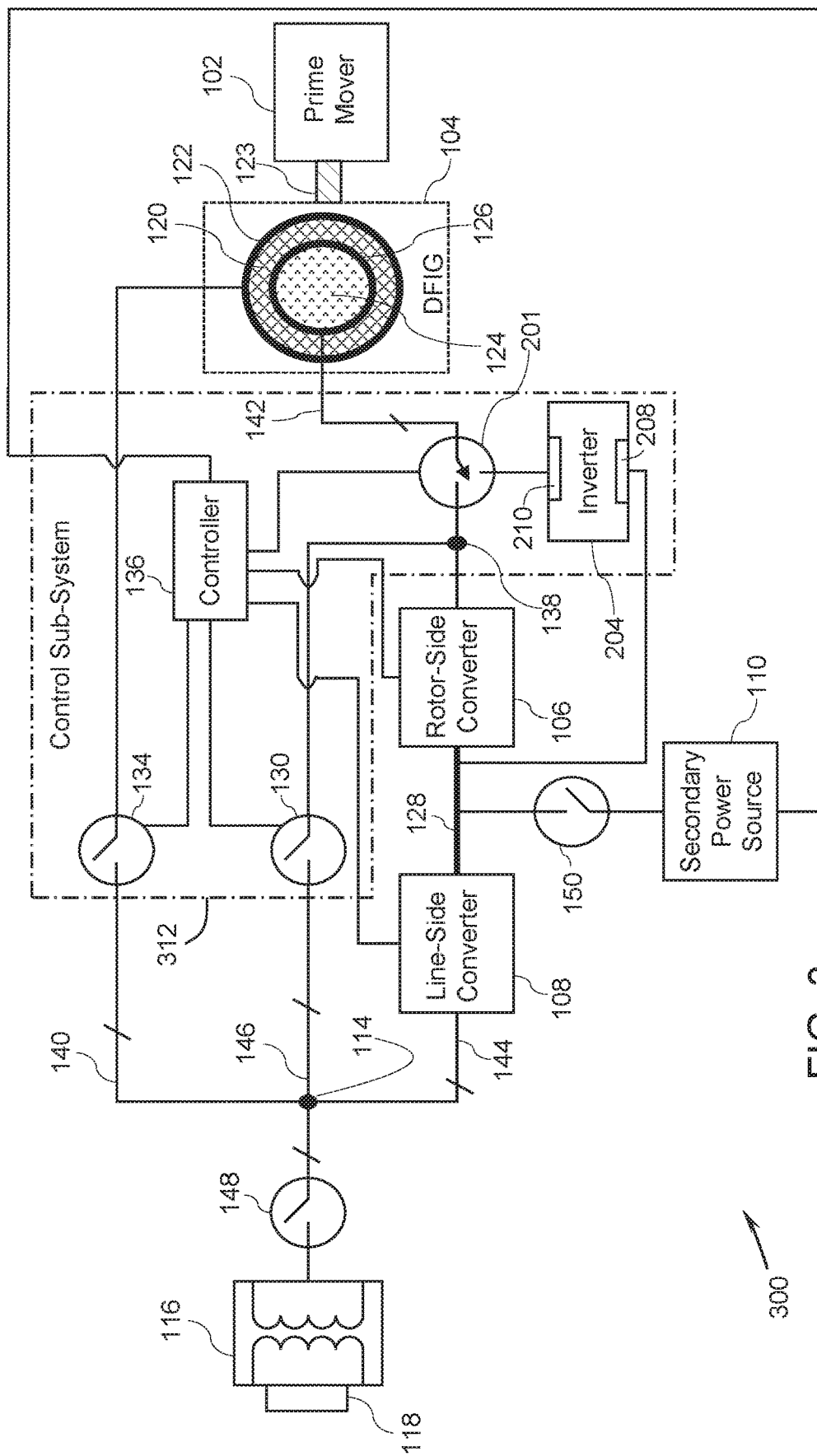
FIG. 3 is a block diagram representation of another power generation system, in accordance with one embodiment of the present specification.

FIG. 3 is a block diagram representation of another power generation system (300), in accordance with one embodiment of the present specification. The power generation system (300) of FIG. 3 may be representative of one embodiment of the power generation system (200) of FIG. 2 and include some similar components as used in FIG. 2. The power generation system (300) includes the prime mover (102), the DFIG (104), the rotor-side converter (106), the line-side converter (108), the secondary power source (110), and a control sub-system (312) interconnected as shown in FIG. 3.

The control sub-system (312) of FIG. 3 is representative of one embodiment of the control sub-system (212) of FIG. 2. The control sub-system (312) includes the plurality of switching element (130, 201), the third switching element (134), and the inverter (204). In comparison to the control sub-system (212) of FIG. 2, the control sub-system (312) of FIG. 3 does not include the energy storage device (202). In the embodiment of FIG. 3, the input port (208) of the inverter (204) is coupled to the DC-link (128). The inverter (204) receives an input DC power from the DC-link (128) and converts the input DC power into an output AC power. The output port (210) of the inverter (204) is coupled to the switching element (201). The controller (136) is operatively coupled to the switching elements (130, 201). Further, the controller (136) may reconfigure the power generation system (300) based at least on the value of the operating parameter corresponding to the DFIG (104), the prime mover (102), and/or the secondary power source (110) to increase electrical power production by the power generation system (300). More particularly, the controller (136) is configured to control switching of the switching elements (130, 201) such that overall electrical power production by the power generation system (300) is increased. Further details of reconfiguring the power generation system (300) is described in conjunction with FIGS. 5, 7, 8 and 9.

In certain embodiments, in the configurations FIGS. 2 and 3, the controller (136) may be configured to operate the third switching element (134) during one or more of a start-up of the DFIG (104), when the operating speed of the rotor (124) is below a minimum rpm value, or when the operating speed of the rotor (124) is above maximum rpm value. The minimum rpm value is representative of the operating speed of the rotor (124) below which if the DFIG (104) is operated, the DFIG (104) may get damaged. The maximum rpm value is representative of the operating speed of the rotor (124) above which if the DFIG (104) is operated, the power generated at the rotor winding (126) may damage the one or both the rotor-side converter (106) and the line-side converter (108). Therefore, in the embodiments of FIGS. 2 and 3, the controller (136) may be configured to operate the third switching element (134) in the conducting state for operating speed of the rotor (124) in a range between the minimum rpm value and the maximum rpm value. Also, the controller (136) may be configured to operate the third switching element (134) in the non-conducting state when the operating speed of the rotor (124) is outside the range between the minimum rpm value and the maximum rpm value so that the DFIG (104) and the rotor-side converter (106) and the line-side converter (108) are safely operated. Moreover, in certain embodiments, the controller (136) may be configured to operate the third switching element (134) in the non-conducting state during a fault condition.

Figure 4:
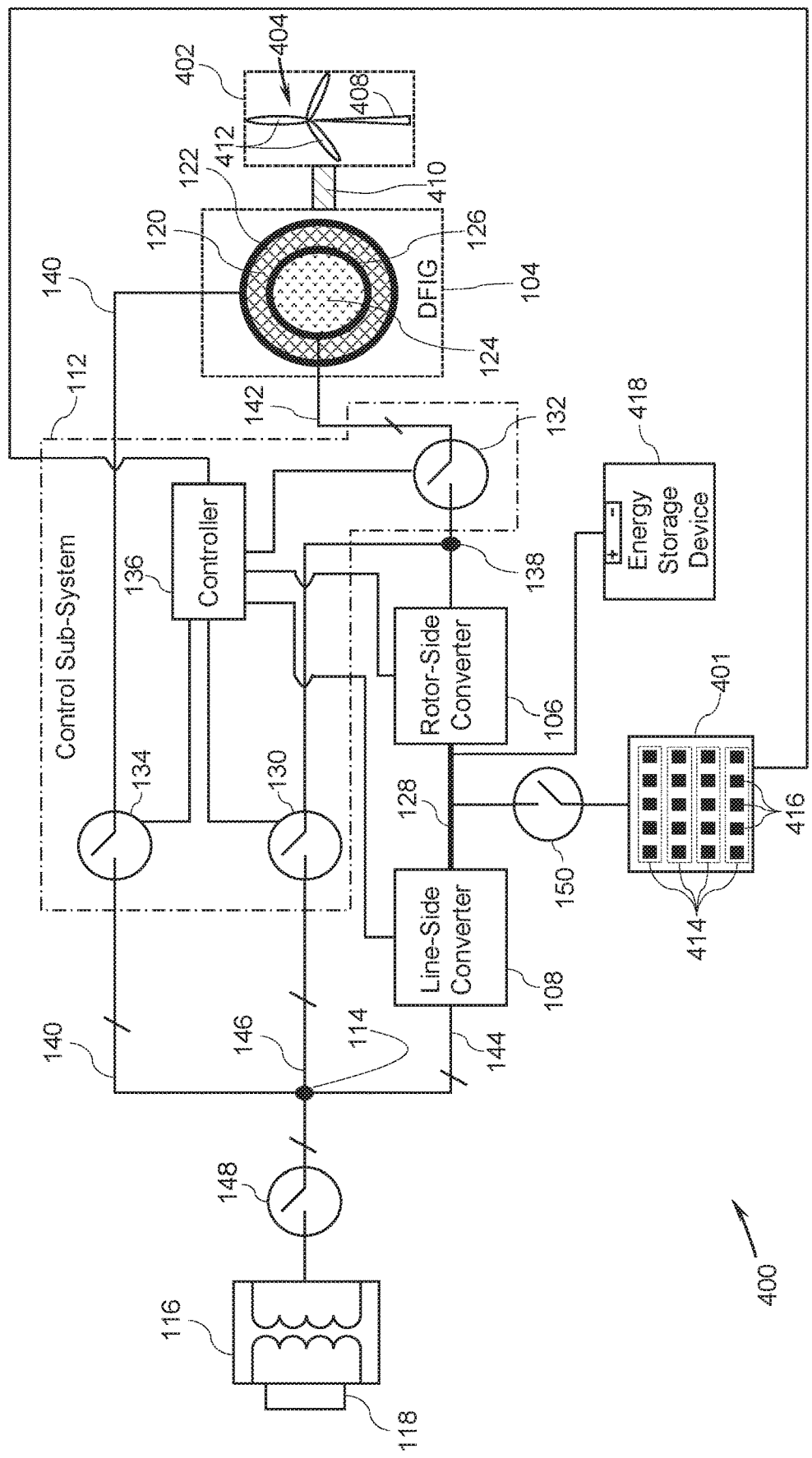
FIG. 4 is a block diagram representation of a wind based power generation system, in accordance with one embodiment of the present specification.

FIG. 4 is a block diagram representation of a wind based power generation system (400), in accordance with one embodiment of the present specification. The wind based power generation system (400) of FIG. 4 may be representative of one embodiment of the power generation system (100) of FIG. 1 and include some similar components as used in FIG. 1. For example, the power generation system (400) includes the DFIG (104), the rotor-side converter (106), the line-side converter (108), and a control sub-system (112) interconnected as shown in FIG. 4. In the embodiment of FIG. 4, a wind turbine (402) is used as a prime mover and a photovoltaic (PV) power source 401 is used as a secondary power source.

The wind turbine (402) may include a rotor (404), a tower (408), and a shaft (410) coupled to the rotor (404). The rotor (404) is mounted on the tower (408). Also, a plurality of rotor blades (412) is coupled to the shaft (410). The wind turbine (402) may be operatively coupled to the DFIG (104) via the shaft (410), directly or through a gear box (not shown). During operation, based on a speed and direction of wind, the rotor blades (412) rotate causing the shaft (410) to rotate. The rotational speed of the shaft (410) may be based on various parameters including, but not limited to, a pitch of the rotor blades (412) and a torque exerted on the rotor blades (412). Moreover, the rotations of the shaft (410) cause rotations of the rotor (124) of the DFIG (104) leading to generation of the stator power ($P_{Stator}$) and the slip power ($P_{Slip}$) depending on the wind speed around the wind turbine (402).

Moreover, in some embodiments, the PV power source (401) may include one or more PV arrays (414), where each PV array (414) may include at least one PV module (416). A PV module (416) may include a suitable arrangement of a plurality of PV cells (diodes and/or transistors, not shown). The PV power source (401) may generate a DC voltage constituting a secondary electrical power that depends on solar insolation, weather conditions, and/or time of the day. Accordingly, the PV power source (401) may be configured to supply the secondary electrical power to the DC-link (128).

The PV power source (401) may be coupled to the DC-link (128) via a switching element (150). In some embodiments, the PV power source (401) may be electrically coupled to the DC-link (128) via a DC-DC converter (not shown). The DC-DC converter may be electrically coupled between the PV power source (401) and the DC-link (128). In such embodiments, the secondary electrical power may be supplied from the PV power source (401) to the DC-link (128) via the DC-DC converter. The DC-DC converter may be operated as a buck converter, a boost converter, or a buck-boost converter, and may be controlled by the controller (136).

In some embodiments, the power generation system (400) also includes an energy storage device (418). The energy storage device (418) may include one or more batteries, capacitors, or a combination thereof. The energy storage device (418) may be coupled to the DC-link (128) and configured to store the power available on the DC-link (128) or supply power to the DC-link (128) when required.

The wind based power generation system (400) also includes the control sub-system (112) for enhancing the electrical power production by the wind based power generation system (400). The control sub-system (112) may reconfigure the power generation system (400) based on a value of an operating parameter such as a wind speed corresponding to the wind turbine (402). More particularly, the controller (136) may be configured to control switching of the switching elements (130, 132, and/or 134) to enhance the electrical power production by the power generation system (400) based on a value of the wind speed. Further details of reconfiguring the power generation system (400) is described in conjunction with FIGS. 5, 6, 8, and 9.

Figure 5:
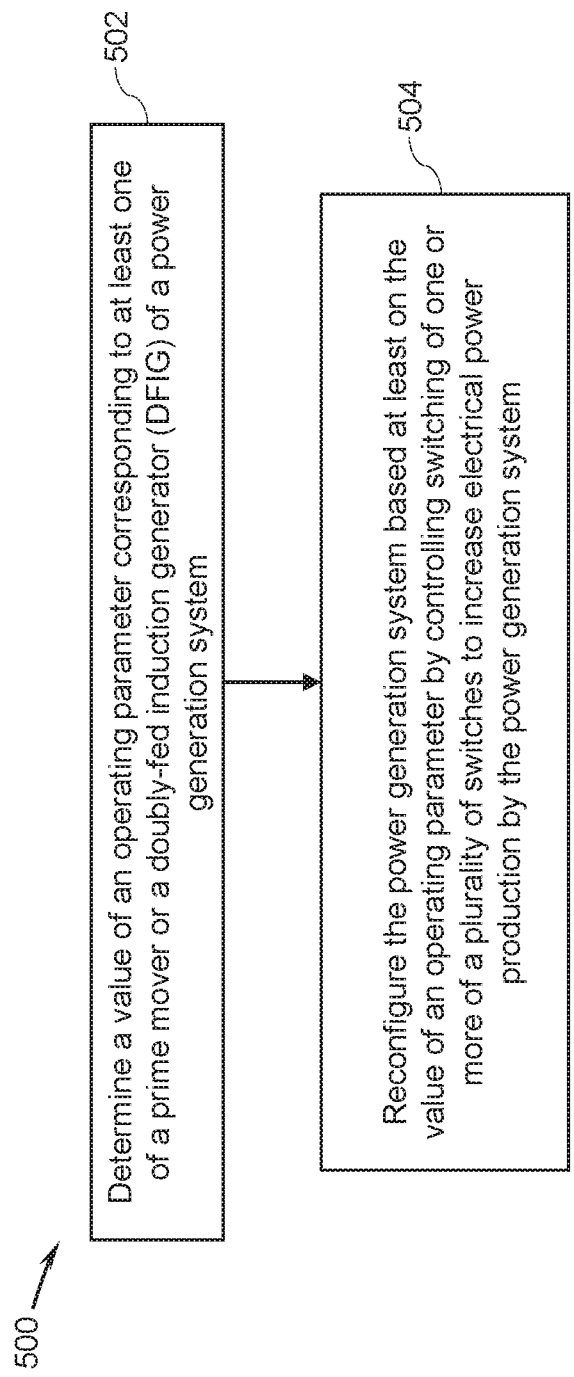
FIG. 5 is a flow diagram of a method for enhancing electrical power generation by the power generation systems of FIG. 1-4, in accordance with one embodiment of the present specification.

Referring now to FIG. 5, a flow diagram (500) of a method for enhancing electrical power generation by the power generation systems of FIGS. 1-4 is presented, in accordance with one embodiment of the present specification. In some embodiments, when power generated by the DFIG (104) is low it may be desirable to seek for a control methodology that leads to enhancement of the electrical power production by the power generation systems (100, 200, 300, 400). In some embodiments, at step (502), the respective controllers (136) in the control sub-systems (112, 212, 312) is configured to determine a value of an operating parameter corresponding to at least one of the prime mover (102), the DFIG (104), or the secondary power source (110).

As previously noted, the controller (136) may determine the operating parameter such as but not limited to the wind speed (e.g., in the embodiment of FIG. 4), the operating speed of the prime mover (102), the operating speed of a rotor (124) of the DFIG (104), a magnitude of the slip power ($P_{Slip}$), a magnitude of the stator power ($P_{Stator}$), the DFIG output power metric (described later) corresponding to the DFIG (104) for a predetermined future time duration, the secondary power metric (described later) corresponding to the secondary power source (110) for the predetermined future time duration. In a non-limiting example, the operating parameters such as the magnitude of the slip power ($P_{Slip}$) and the magnitude of the stator power ($P_{Stator}$) may be determined by the controller (136) by measuring voltage and current at the rotor winding (126) and the stator winding (122) using one or more sensors (not shown) disposed at the rotor winding (126) and the stator winding (122), respectively. The operating parameters such as the operating speed of the prime mover (102) and the operating speed of a rotor (124) may be determined by the controller (136) based on electrical signals received from one or more RPM sensors (not shown) disposed at the prime mover (102) and the DFIG (104), respectively. The wind speed may be determined by the controller (136) using sensors such as anemometers disposed at the wind turbine (402).

Moreover, at step (504), the controller (136) may also reconfigure the respective power generation systems (100, 200, 300, or 400) based at least on the value of the operating parameter. In some embodiments, reconfiguring the power generation systems (100, 200, 300, or 400) includes operating the power generation systems (100, 200, 300, or 400) either in a secondary power priority (SPP) mode or in a partial power conversion (PPC) mode (described later) such that overall power production by the power generation systems (100, 200, 300, or 400) is improved. In some embodiments, the controller (136) may reconfigure the respective power generation systems (100, 200, 300, or 400) by controlling switching of one or more switching elements (130, 132, 201, or 134) to increase electrical power production by the power generation system. In certain embodiments, in the respective power generation systems (100, 200, 300, or 400), the switching of the corresponding at least one of the plurality switching elements (130, 132, 201) or the third switching element (134) is controlled based on the value of an operating parameter to connect the rotor-side converter (106) in parallel to the line-side converter (108) to increase an electrical power production by the power generation system (100). More particularly, the controller (136) is configured to send control signals to at least one of the plurality switching elements (130, 132, 201) or the third switching element (134) to operate them in a conducting state or a non-conducting state. Further details of reconfiguring the power generation systems (100, 200, 300, or 400) is described in conjunction with the methods described in FIGS. 6, 7, and 9 in accordance with some embodiments of the present specification.

Figure 6:
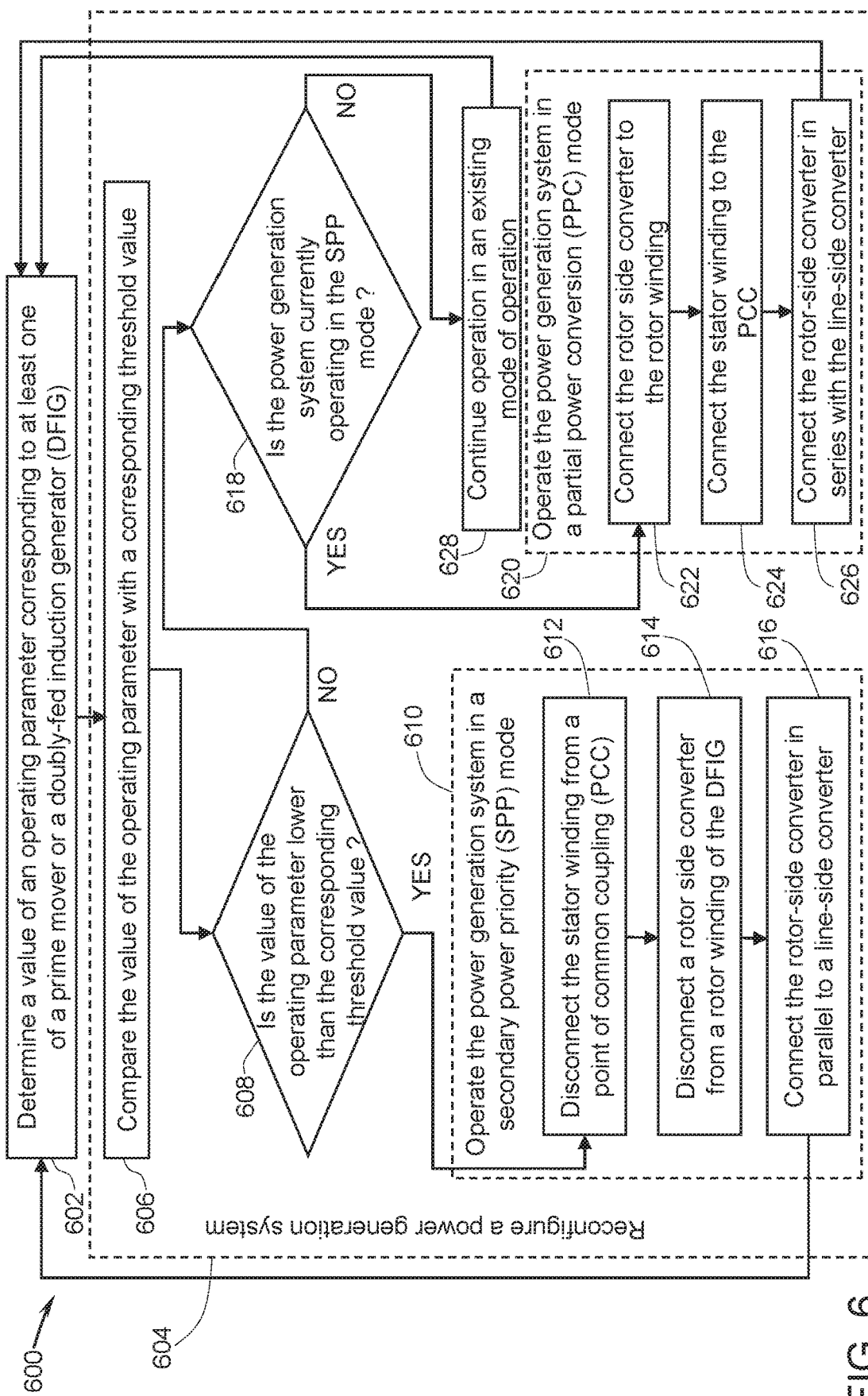
FIG. 6 is a flow diagram of a method for enhancing electrical power generation by the power generation system of FIG. 1 or FIG. 4, in accordance with one embodiment of the present specification.

Turning now to FIG. 6, a flow diagram (600) of a method for enhancing electrical power generation by the power generation system (100) of FIG. 1 or the power generation system (400) of FIG. 4 is presented, in accordance with one embodiment of the present specification. When operation of the power generation system (100, 400) is initiated, the power generation system (100, 400) may be operated in the partial power conversion (PPC) mode as a default mode of operation. In the PPC mode of operation, the stator winding (122) of the DFIG (104) is coupled to the PCC (114), the rotor winding (126) of the DFIG (104) is coupled to the rotor-side converter (106), and the rotor-side converter (106) is coupled in series with the line-side converter (108). More particularly, in the PPC mode, while the switching elements (132) and 134 operate in the conducting state, the switching element (130) operates in the non-conductive state.

During operation, at step (602), a value of an operating parameter corresponding to at least one of the prime mover (102) or the DFIG (104) is determined by the controller (136). The step (602) is similar to the step (502) of FIG. 5, description of which is not repeated herein. Moreover, at step (604), the power generation system (100, 400) is reconfigured by the controller (136) to enhance the electrical power production by the power generation system (100, 400). The step (604) may include one or more of the sub-steps (606-628).

At step (606), the value of the operating parameter is compared with a corresponding threshold value by the controller (136) of the control sub-system (112). In some embodiments, the threshold value is representative of a minimum permissible value corresponding to a given operating parameter. For example, if the operating parameter is a wind speed, the corresponding threshold value is a cut-in wind speed. The cut-in wind speed is representative of a wind speed at which a prime mover such as the wind turbine (402) can be safely operated. Alternatively, the cut-in wind speed is representative of a wind speed (km/hour) below which power generated by the DFIG (104) starts to reduce below a predefined level. In another non-limiting example, if the operating parameter is an operating speed (rpm) of the rotor (124) of the DFIG (104), the corresponding threshold value is a cut-in rotor speed below which the power generated by the DFIG (104) starts to reduce below the predefined level.

Furthermore, after the comparison is performed at the step (606), a check may be performed, at step (608), by the controller (136) to determine whether the value of the operating parameter is lower than the corresponding threshold value. In a non-limiting example, a check may be performed to determine whether the wind speed around the prime mover (i.e., the wind turbine (402)) is lower than the cut-in wind speed. At step (608), if it is determined that the value of the operating parameter is lower than the corresponding threshold value, the power generation system (100, 400) may be operated in a secondary power priority (SPP) mode, at step (610). The step of operating the power generation system (100, 400) in the SPP mode includes sub-steps (612, 614, and 616). In the embodiments of FIGS. 1 and 4, in the SPP mode, the DFIG (104) may be completely disconnected from the PCC (114) and the rotor-side converter (106).

To aid in the operation of the power generation system (100, 400) in the SPP mode, at step (612), the controller (136) may be configured to disconnect the stator winding (122) from the PCC (114). The controller (136) may send a control signal to the third switching element (134) to operate the third switching element (134) in a non-conducting state to disconnect the stator winding (122) from the PCC (114). Moreover, at step (614), the controller (136) is configured to disconnect the rotor-side converter (106) from the rotor winding (126) of the DFIG (104). The controller (136) may send another control signal to the second switching element (132) to operate the second switching element (132) in a non-conducting state. In addition, at step (616), the rotor-side converter (106) is connected in parallel to the line-side converter (108). The controller (136) may send yet another control signal to the first switching element (130) such that the first switching element (130) is operated in a conducting state to connect the rotor-side converter (106) in parallel with the line-side converter (108).

Accordingly, in the SPP mode of operation, in one embodiment, the DFIG (104) is disconnected from the PCC (114) and the rotor-side converter (106) while the rotor-side converter (106) is connected in parallel with the line-side converter (108). Moreover, the connection of the secondary power source (110) remains intact with the DC-link (128). Consequently, in the SPP mode of operation, both the rotor-side converter (106) and the line-side converter (108) are utilized to evacuate only the secondary power ($P_{Secondary}$). Therefore, increased amount of the secondary power ($P_{Secondary}$) can be evacuated if available. Accordingly, overall power production by the power generation system (100, 400) is enhanced. In certain embodiments, once the steps (612-616) are executed, the controller (136) may store operating mode data indicative of the operating mode being the SPP mode in a memory device (not shown) associated with the controller (136).

Referring again to the step (608), if it is determined that the value of the operating parameter is not lower than the corresponding threshold value, another check may be carried out, at step (618), to ascertain whether the power generation system (100, 400) is already operating is in the SPP mode. In some embodiments, the controller (136) may determine if the power generation system (100, 400) is already operating is in the SPP mode based on the stored operating mode data. In certain embodiments, the controller (136) may determine if the power generation system (100, 400) is already operating is in the SPP mode by ascertaining operating states of the switching elements (130, 132, and 134). For example, if the switching elements (132) and (134) are operated in the non-conducting state and the switching element (130) is operated in the conducting mode, the controller (136) may determine that the power generation system (100, 400) is operating in the SPP mode, or vice-versa.

At step (618), if it is ascertained that the power generation system (100, 400) is operating is in the SPP mode, the power generation system (100, 400) may be configured to operate in a PPC mode at step (620). In the PPC mode, power generated from both the DFIG (104) and the secondary power source (110) may be supplied to the PCC (114). The step of operating the power generation system (100, 400) in the PPC mode includes sub-steps (622, 624, and 626).

To ensure the operation of the power generation system (100, 400) in the PPC mode, at step (622), the controller (136) is configured to connect the rotor-side converter (106) to the rotor winding (126) of the DFIG (104). The controller (136) may send a control signal to the second switching element (132) to operate the second switching element (132) in a conducting state. Moreover, at step (624), the controller (136) may be configured to connect the stator winding (122) to the PCC (114). The controller (136) may send another control signal to the third switching element (134) to operate the third switching element (134) in a conducting state to connect the stator winding (122) to the PCC (114). In addition, at step (626), the rotor-side converter (106) is connected in series with the line-side converter (108). The controller (136) may send yet another control signal to the first switching element (130) such that the first switching element (130) is operated in the non-conducting state to connect the rotor-side converter (106) in series with the line-side converter (108).

Accordingly, in the PPC mode, in one embodiment, the DFIG (104) is connected to the PCC (114) and the rotor-side converter (106) while the rotor-side converter (106) is connected in series with the line-side converter (108). Moreover, the connection of the secondary power source (110) remains intact with the DC-link (128). In certain embodiments, once the steps (622-626) are executed, the controller (136) may store operating mode data indicative of the operating mode being the SPP mode in a memory device (not shown) associated with the controller (136).

Referring to the step (618) again, if it is ascertained that the power generation system (100, 400) is not operating is in the SPP mode, the controller (136) may continue operation of the power generation system (100, 400) in the existing mode of operation as indicated by step (628). For example, the power generation system (100, 400) not operating is in the SPP mode is indicative of the power generation system (100, 400) currently operating in the PPC mode. Accordingly, operation of the power generation system is maintained in the existing mode (i.e., the PPC mode).

Figure 7:
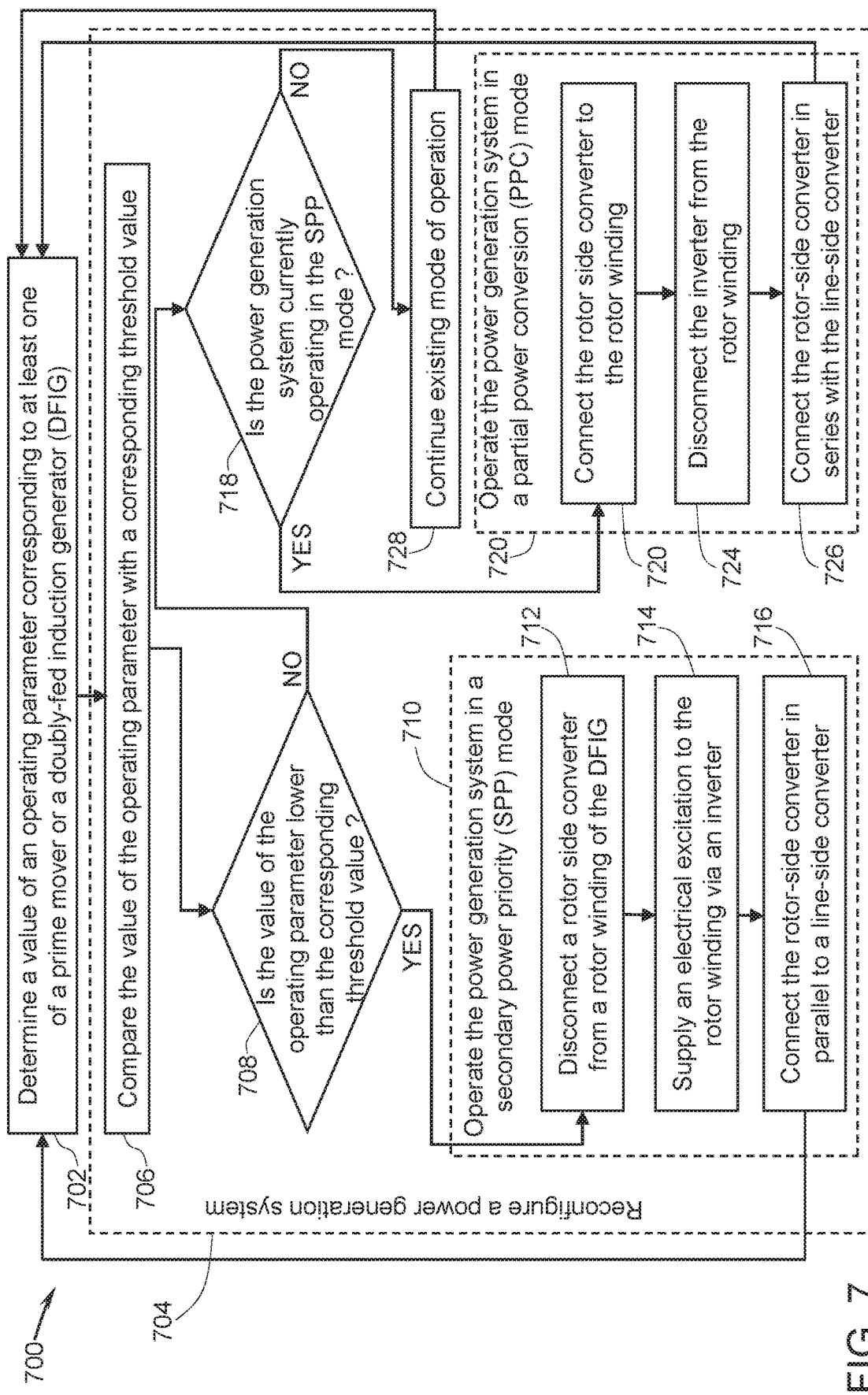
FIG. 7 is a flow diagram of a method for enhancing electrical power generation by the power generation system of FIG. 2 or FIG. 3, in accordance with one embodiment of the present specification.

Turning now to FIG. 7, a flow diagram (700) of a method for enhancing electrical power generation by the power generation system (200) of FIG. 2 or the power generation system (300) of FIG. 3 is presented, in accordance with one embodiment of the present specification. When operation of the power generation system (200, 300) is started, the power generation system (200, 300) may be operated in the PPC mode as a default mode of operation. In the PPC mode of operation corresponding to the power generation system (200, 300), the stator winding (122) of the DFIG (104) is coupled to the PCC (114), the rotor winding (126) of the DFIG (104) is coupled to the rotor-side converter (106), and the rotor-side converter (106) is coupled in series with the line-side converter (108). More particularly, in the PPC mode, while the switching element (201) operates in the internal excitation state, the switching element (130) operates in the non-conductive state. The method of flow chart (700) includes steps (702-728).

The flow diagram (700) of FIG. 7 includes one or more steps that are similar to the steps described in FIG. 6, description of which is not repeated herein. In some embodiments, steps for operating the power generation system (200, 300) in the SPP mode (see step (710)) and the PPC mode (see step (720)) are different in comparison to the respective steps (610 and 620) of FIG. 6.

In some embodiments, at step (710) the power generation system (200, 300) may be operated in the SPP mode. The step of operating the power generation system (200, 300) in the SPP mode includes sub-steps (712, 714, and 716).

To aid in the operation of the power generation system (200, 300) in the SPP mode, at step (712), the controller (136) is configured to disconnect the rotor-side converter (106) from the rotor winding (126) of the DFIG (104) by operating the second switching element (201) in the external excitation state. In the external excitation state, the second switching element (132) electrically connects the rotor winding (126) with the output port (210) of the inverter (204). Consequently, at step (714), the electrical excitation to the rotor winding (126) may be supplied via the inverter (204). Such electrical excitation from the inverter (204) aids in regulating frequency of the stator power ($P_{Stator}$) of the DFIG (104). The stator power ($P_{Stator}$) may be supplied to the PCC (114). In the embodiment of FIG. 2, the inverter (204) generates the electrical excitation (i.e., the AC power) from an input power received from the energy storage device (202). In the embodiment of FIG. 3, the inverter (204) generates the electrical excitation from an input power received from the DC-link (128).

In addition, at step (716), the rotor-side converter (106) is connected in parallel to the line-side converter (108). The controller (136) may send another control signal to the first switching element (130) such that the first switching element (130) is operated in a conducting state to connect the rotor-side converter (106) in parallel with the line-side converter (108).

Accordingly, in the SPP mode of operation, in one embodiment, the rotor winding (126) is disconnected from the rotor-side converter (106) while the rotor-side converter (106) is connected in parallel with the line-side converter (108). Moreover, connection of the secondary power source (110) remains intact with the DC-link (128). Consequently, in the SPP mode of operation, both the rotor-side converter (106) and the line-side converter (108) are utilized to evacuate only the secondary power ($P_{Secondary}$) from the secondary power source (110). Therefore, based on the electrical excitation from the inverter (204) the stator power ($P_{Stator}$) is generated and supplied to the PCC (114) in addition to the secondary power ($P_{Secondary}$) from the secondary power source (110). Therefore, in addition to the stator power ($P_{Stator}$), an increased amount of the secondary power ($P_{Secondary}$) can be evacuated if available. Consequently, overall power production by the power generation system (200, 300) is enhanced. In certain embodiments, once the steps (712-716) are executed, the controller (136) may store operating mode data indicative of the operating mode being the SPP mode in a memory device (not shown) associated with the controller (136).

Furthermore, at step (720), the power generation system (200, 300) may be configured to operate in a PPC mode. In the PPC mode, power generated from both the DFIG (104) and the secondary power source (110) may be supplied to the PCC (114). The step of operating the power generation system (200, 300) in the PPC mode includes sub-steps (722, 724, and 726).

To ensure the operation of the power generation system (200, 300) in the PPC mode, at step (722), the controller (136) is configured to connect the rotor-side converter (106) to the rotor winding (126) of the DFIG (104). The controller (136) may send a control signal to the second switching element (201) to operate the second switching element (201) in the internal excitation state. In the internal excitation state, the second switching element (201) electrically connects the rotor winding (126) to the rotor-side converter (106). Consequently, at step (724), the rotor winding (126) is disconnected from the inverter (204). The rotor winding (126) receives the electrical excitation from the rotor-side converter (106) that aids in regulating frequency of the stator power ($P_{Stator}$) of the DFIG (104). In addition, at step (726), the rotor-side converter (106) is connected in series with the line-side converter (108). The controller (136) may send yet another control signal to the first switching element (130) such that the first switching element (130) is operated in the non-conducting state to connect the rotor-side converter (106) in series with the line-side converter (108).

Figure 8:
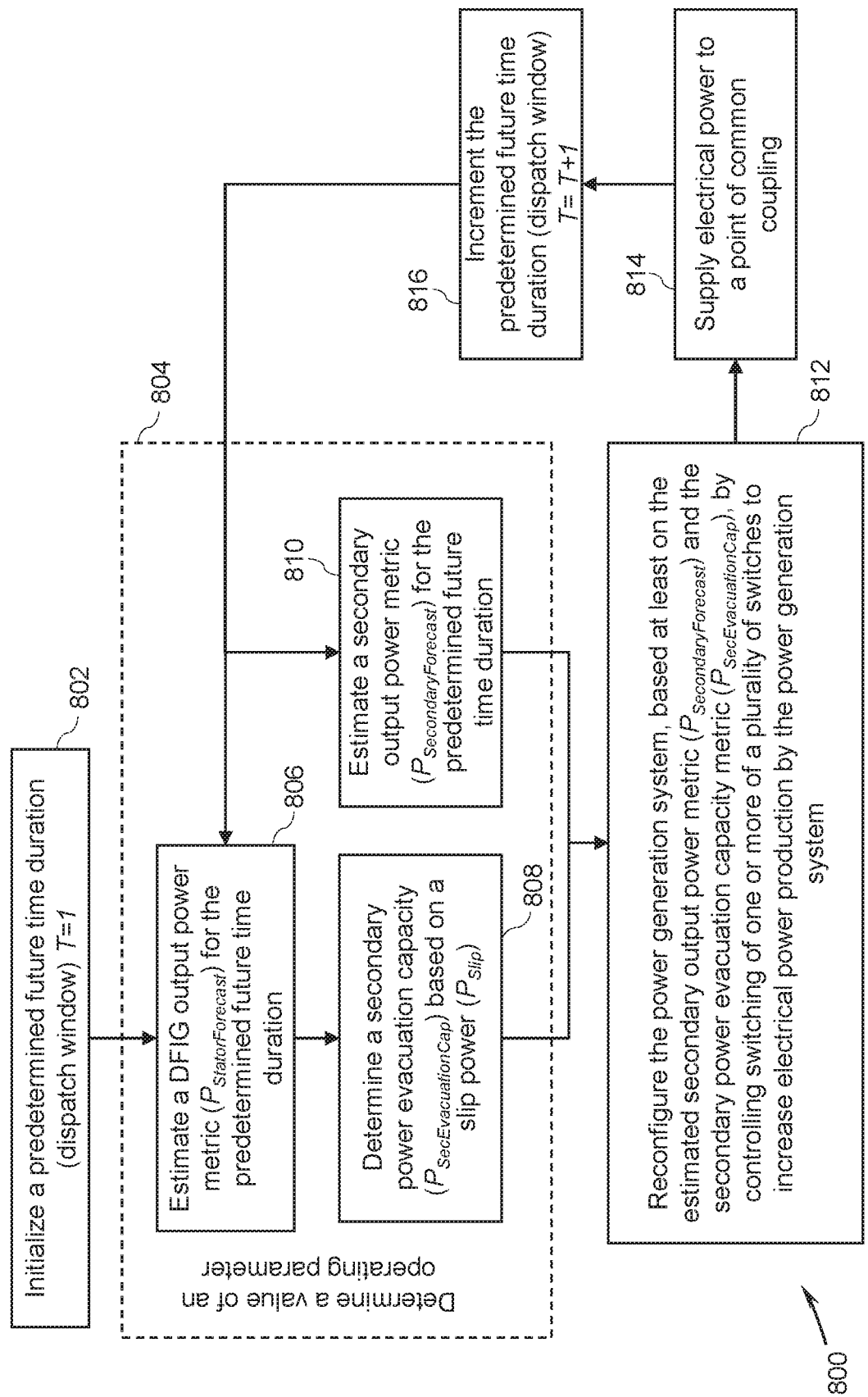
FIG. 8 is a flow diagram of a method for enhancing electrical power generation by the power generation systems of any of the FIGS. 1-4, in accordance with one embodiment of the present specification.

FIG. 8 is a flow diagram (800) of a method for enhancing electrical power production in the power generation system of any of the FIGS. 1-4, in accordance with one embodiment of the present specification. For ease of illustration, the method of FIG. 8 is described in conjunction with power generation system (100) of FIG. 1.

At step (802), a predetermined future time duration, hereinafter also referred to as a dispatch window T, is initialized to T=1. Moreover, at step (804), a value of the operating parameter is determined. In the method of FIG. 8, the operating parameter may include a DFIG output power metric ($P_{StatorForecast}$) corresponding to the DFIG for the predetermined future time duration (the dispatch window T) and a secondary power metric ($P_{SecondaryForecast}$) corresponding to the secondary power source (110, 401) for the predetermined future time duration. The term "DFIG output power metric" ($P_{StatorForecast}$) as used herein refers to an estimated level of the stator power ($P_{Stator}$) for the predefined future time duration. The term "secondary power metric" ($P_{SecondaryForecast}$) as used herein refers to an estimated level of the secondary power ($P_{Secondary}$) generated by the secondary power source (110) for the predefined future time duration. The step (804) of the operating parameter includes sub-steps (806, 808, and 810).

At step (806), the controller (136) is configured to estimate the DFIG output power metric ($P_{StatorForecast}$) for the predetermined future time duration (i.e., for the dispatch window T). In an embodiment when the prime mover (102) is a hydro turbine, the DFIG output power metric ($P_{StatorForecast}$) may be estimated based on parameters including but not limited to a weather forecast, tidal energy forecast, position information of the moon, or combinations thereof. In the embodiment of FIG. 4 where the wind turbine (402) is used as the prime mover, the DFIG output power metric ($P_{StatorForecast}$) may be estimated based at least on a wind forecast data for the predetermined future time duration. In some embodiments, the controller (136) may receive the wind forecast data from an external source such as satellite or a server computer (not shown). In certain embodiments, the controller (136) may be configured to determine the forecast data for the predetermined future time duration.

Moreover, at step (808), a secondary power evacuation capacity ($P_{SecEvacuationCap}$) is determined based on the slip power ($P_{Slip}$). As previously noted, the slip power ($P_{Slip}$) is dependent on the operating speed ($N_r$) and the slip value (S) of the DFIG (104). In one embodiment, when the DFIG (104) is operated at the super synchronous speed the slip power ($P_{Slip}$) is generated at the rotor winding (126) of the DFIG (104). Such slip power is supplied to the PCC (114) via the rotor-side converter (106) and the line-side converter (108). Accordingly, when the DFIG (104) is operating at the super synchronous speed, the secondary power evacuation capacity ($P_{SecEvacuationCap}$) may be determined by the controller (136) using following equation (3):

$$P_{SecEvacuationCap} = P_{RatedLSC} - P_{Slip} \quad (3)$$

Where, $P_{RatedLSC}$ is representative of the rated power of the line-side converter (108).

In an embodiment when the DFIG (104) is operated at the sub synchronous speed the slip power ($P_{Slip}$) is received by the rotor winding (126) of the DFIG (104). Such slip power ($P_{Slip}$) is supplied to rotor winding (126) from the DC-link (128) via the rotor-side converter (106). Accordingly, when the DFIG (104) is operating at the sub synchronous speed, the secondary power evacuation capacity ($P_{SecEvacuationCap}$) may be determined by the controller (136) using following equation (4):

$$P_{SecEvacuationCap} = P_{RatedLSC} + P_{Slip} \quad (4)$$

Furthermore, at step (810), the controller (136) may be configured to estimate a secondary power metric ($P_{SecondaryForecast}$) for the predetermined future time duration (i.e., for the dispatch window T). In an embodiment when the secondary power source is a PV power source such as the PV power source (401), the secondary power metric ($P_{SecondaryForecast}$) may be estimated based on parameters including but not limited to a weather forecast, solar insolation forecast, time of the day, or combinations thereof.

Additionally, at step (812), the controller (136) may reconfigure the power generation system (100), based at least on the estimated secondary power metric ($P_{SecondaryForecast}$), the secondary power evacuation capacity ($P_{SecEvacuationCap}$), and the DFIG output power metric ($P_{StatorForecast}$), by controlling switching of one or more of a plurality of switches to increase electrical power production by the power generation system (100). Further details of reconfiguring the power generation system (100) is described in conjunction with FIG. 9.

Once the power generation system (100) is reconfigured, the electrical power may be supplied to the PCC (114) from the secondary power source (110) or both the DFIG (104) and the secondary power source (110) as indicated by step (814). Moreover, at step (816) the dispatch window is incremented by one (1) and control may be transferred to steps (806 and 810) where the DFIG output power metric ($P_{StatorForecast}$) and the secondary power metric ($P_{SecondaryForecast}$) may be estimated again for the incremented dispatch window.

Figure 9:
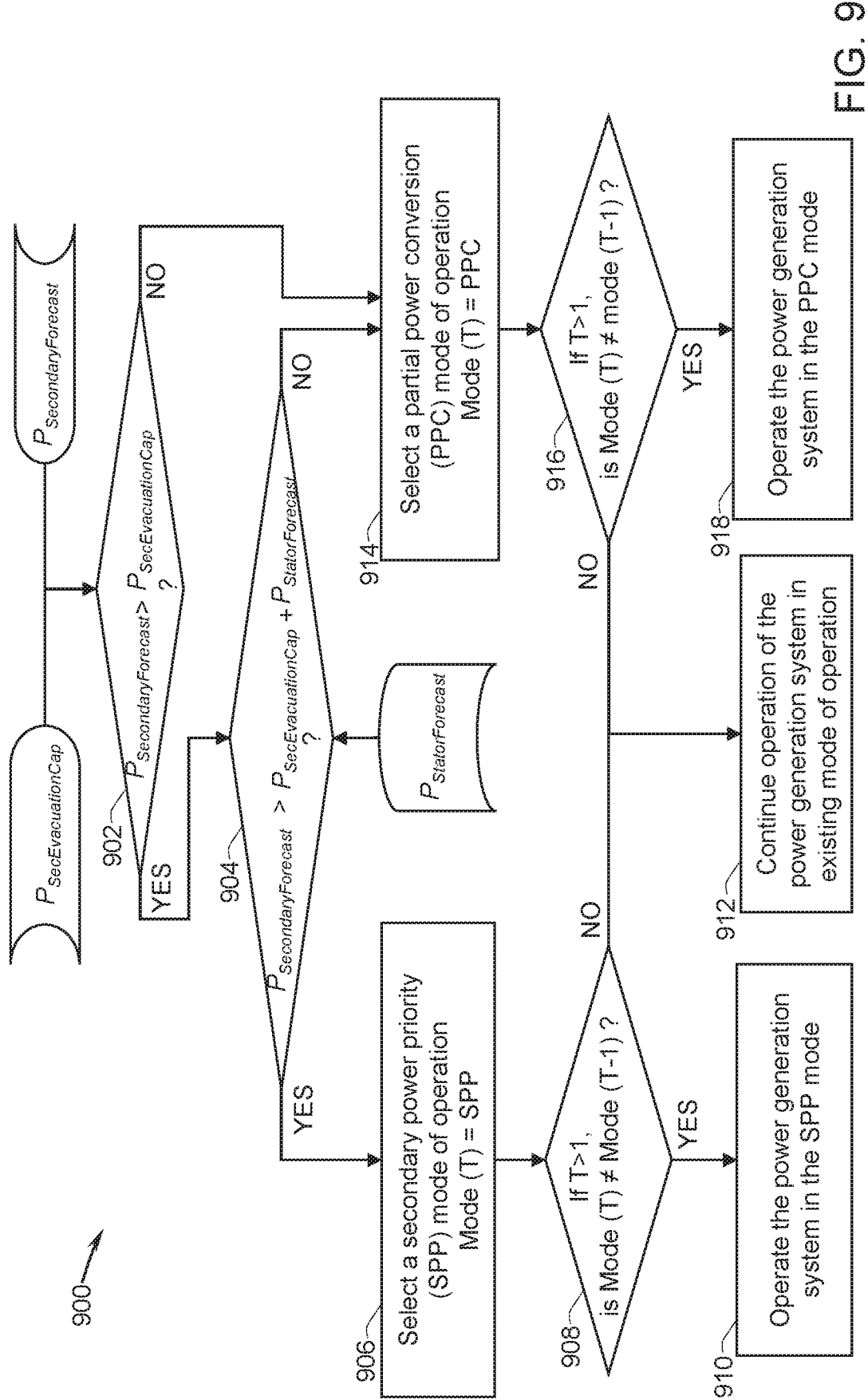
FIG. 9 is a flow diagram of a method for reconfiguring power generation systems of any of the FIGS. 1-4, in accordance with one embodiment of the present specification.

FIG. 9 is a flow diagram (900) of a method for reconfiguring the power generation system of any of the FIGS. 1-4, in accordance with one embodiment of the present specification. For ease of illustration, the method of FIG. 9 is described in conjunction with the power generation system (100) of FIG. 1. The power generation system (100) is reconfigured based on the values of the DFIG output power metric ($P_{StatorForecast}$), the secondary power evacuation capacity ($P_{SecEvacuationCap}$), and the secondary power metric ($P_{SecondaryForecast}$) determined at steps (806, 808, and 810), respectively.

At step (902), a check may be carried out to determine whether the secondary power metric ($P_{SecondaryForecast}$) is greater than the secondary power evacuation capacity ($P_{SecEvacuationCap}$). At step (902), if it is determined that the secondary power metric ($P_{SecondaryForecast}$) is greater than the secondary power evacuation capacity ($P_{SecEvacuationCap}$), another check may be performed at step (904).

At step (904), the check may be performed to determine whether the secondary power metric ($P_{SecondaryForecast}$) is greater than a sum of the secondary power evacuation capacity ($P_{SecEvacuationCap}$) and the DFIG output power metric ($P_{StatorForecast}$). At step (902), if it is determined that the secondary power metric ($P_{SecondaryForecast}$) is greater than the sum of the secondary power evacuation capacity ($P_{SecEvacuationCap}$) and the DFIG output power metric ($P_{StatorForecast}$), the controller (136) may select the mode of operation of the power generation system (100) as the SPP mode at step (906). Accordingly, the mode of operation in the given dispatch window may be set as SSP mode. Furthermore, if the dispatch window is not the first dispatch window, for example when T>1, the controller (136) may perform another check, at step (908), to determine whether the operating mode set at the step (906) is different than the operating mode in a previous dispatch window (T-1).

At step (908), if it is determined that the operating mode set at the step (906) is different than the operating mode in the previous dispatch window (T-1), the controller (136) may operate the power generation system in the SPP mode at step (910). In some embodiments, the power generation system such as the power generation systems (100, 400) may be operated in the SPP mode as described in step (610) of FIG. 6. In some embodiments, the power generation system such as the power generation systems (200, 300) may be operated in the SPP mode as described in step (710) of FIG. 7. At step (908), if it is determined that the operating mode set at the step (906) is same as the operating mode in the previous dispatch window (T-1), the controller (136) may continue operation of the power generation system (100), at step (912), in the existing mode, for example, in the operating mode of the previous dispatch window.

Referring again to step (902), if it is determined that the secondary power metric ($P_{SecondaryForecast}$) is lower than the secondary power evacuation capacity ($P_{SecEvacuationCap}$), step (914) is executed. Also, at step (904), if it is determined that the secondary power metric ($P_{SecondaryForecast}$) is lower than the sum of the secondary power evacuation capacity ($P_{SecEvacuationCap}$) and the DFIG output power metric ($P_{StatorForecast}$), the step (914) is executed. At step (914), the controller (136) may select the mode of operation of the power generation system as the PPC mode. Accordingly, the mode of operation in the given dispatch window may be set as PPC mode. Furthermore, if the dispatch window is not the first dispatch window, for example when T>1, the controller (136) may perform another check, at step (916), to determine whether the operating mode set at the step (914) is different than the operating mode in a previous dispatch window (T-1).

At step (916), if it is determined that the operating mode set at the step (914) is different than the operating mode in the previous dispatch window (T-1), the controller (136) may operate the power generation system in the PPC mode at step (918). In some embodiments, the power generation system such as the power generation systems (100, 400) may be operated in the PPC mode as described in step (620) of FIG. 6. In some embodiments, the power generation system such as the power generation systems (200, 300) may be operated in the PPC mode as described in step (720) of FIG. 7. At step (916), if it is determined that the operating mode set at the step (914) is same as the operating mode in the previous dispatch window (T-1), the controller (136) may continue operation of the power generation system (100), at step (912), in the existing mode, for example, in the operating mode of the previous dispatch window.

Moreover, in any of the power generation systems (100, 200, 300, 400), in some embodiments, operation in the secondary power priority mode may include transitioning the DFIG (104) in a delta configuration from the wye configuration. Typically, the stator winding (122) of the DFIG (104) is arranged in a wye (or star) connection pattern. In some embodiments, in the secondary power priority mode, the stator winding (122) is configured in a delta pattern. By operating the DFIG (104) in the delta mode advantageously increases an rpm range of the DFIG (104), thereby increasing the electrical power production.

Any of the foregoing steps may be suitably replaced, reordered, or removed, and additional steps may be inserted, depending on the needs of an application.

In accordance with the embodiments described herein, power generation system configurations facilitating enhanced electrical power output are provided. In situations when the value of the operating parameter decreases below the corresponding threshold value the control sub-system (112) reconfigures the power generation system to increase the electrical power production by a power generation system to increase the electrical power production. Reconfiguring the power generation system includes operating the power generation system in the SSP mode or PPC mode. Advantageously, in the SSP mode, both the line-side converter and the rotor-side converter are connected in parallel with each other and are used to evacuate only the secondary electrical power from the secondary power source. Accordingly, more electrical power from the secondary power source can be extracted. Consequently, electrical power source production by the power generation is enhanced. Also, the proposed configurations of the power generation systems facilitate enhanced integration of the secondary electrical power from the secondary power source leading to an increased annual energy production (AEP). In addition, due to increase in the electrical power production cost of electrical power production per unit of the electrical power decreases.

It will be appreciated that variants of the above disclosed and other features and functions, or alternatives thereof, may be combined to create many other different applications. Various unanticipated alternatives, modifications, variations, or improvements therein may be subsequently made by those skilled in the art and are also intended to be encompassed by the following claims.

We claim:

1. A power generation system (100, 200, 300, 400), comprising:
a prime mover (102);
a doubly-fed induction generator (DFIG) (104) operatively coupled to the prime mover (102), wherein the DFIG (104) comprises a rotor winding (126) and a stator winding (122);
a rotor-side converter (106) electrically connectible to the rotor winding (126);
a line-side converter (108) elect: deafly connectible to a point of common coupling (PCC) (114), wherein the line-side converter (108) and the rotor-side converter (106) are coupled to each other via a direct current (DC) link;
a secondary power source (110, 401) electrically coupled to the DC-link; and
a control sub-system comprising:
a plurality of switching elements (130, and 132 or 201); and
a controller (136) operatively coupled to the plurality of switching elements (130, and 132 or 201) and configured to selectively control switching of one or more switching elements of the plurality of switching elements (130, and 132 or 201) based on a value of an operating parameter corresponding to at least one of the prime mover (102), the DIEM (104), or the secondary power source (110, 401) to disconnect the rotor winding from the rotor-side converter and connect the rotor-side converter (106) in parallel with the line-side converter (108) at the PCC to increase an electrical power production by the power generation system (100, 200, 300, 400).

2. The power generation system (100, 200, 300, 400) as claimed in claim 1, wherein the prime mover comprises a wind turbine and the operating parameter comprises a wind speed, an operating speed of the prime mover (102), an operating speed of a rotor (124) of the DFIG (104), an electrical power at the rotor winding (126), an electrical power at the stator winding (122), or combinations thereof.

3. The power generation system (100, 200, 300, 400) as claimed in claim 1, wherein the plurality of switching elements (130, and 132 or 201) comprises a first switching element (130) and a second switching element (132, 201), wherein:

the first switching element (130) is coupled between an interconnection terminal (138) and the PCC (114) and is switched to a conducting state by the controller to connect the rotor-side converter in parallel with the line-side converter at the PCC, and wherein the interconnection terminal (138) is located between the rotor-side converter (106) and the rotor winding (126); and the second switching element (132, 201) is coupled between the interconnection terminal (138) and the rotor winding (126) of the DFIG (104) and is switched to a non-conducting state by the controller to disconnect the rotor winding from the rotor-side converter.

4. The power generation system (200) as claimed in claim 3, further comprising:

an energy storage device (202); and an inverter (204) coupled to the energy storage device (202), wherein an input port (208) of the inverter (204) is coupled to the energy storage device (202) to receive a DC power from the energy storage device (202), and an output port (210) of the inverter (204) is coupled to the second switching element (132, 201), wherein the second switching element (132, 201) is a two-way switch.

5. The power generation system (200) as claimed in claim 4, wherein the controller (136) is configured to facilitate electrical excitation of the rotor winding (126) from the energy storage device (202) by disconnecting the rotor-side converter (106) from the rotor winding (126) and connecting the rotor winding (126) to the output port (210) of the inverter (204) when the rotor-side converter (106) is connected in parallel with the line-side converter (108).

6. The power generation system (300) as claimed in claim 3, further comprising an inverter (204), wherein an input port (208) of the inverter (204) is coupled to the DC-link (128) and an output port (210) of the inverter (204) is coupled to the second switching element (201), wherein the second switching element (201) is a two-way switch.

7. The power generation system (300) as claimed in claim 6, wherein the controller (136) is configured to facilitate electrical excitation to the rotor winding (126) from the DC-link (128) by disconnecting the rotor-side converter (106) from the rotor winding (126) and connecting the rotor winding (126) to the output port (210) of the inverter (204) when the rotor-side converter (106) is connected in parallel to the line-side converter (108).

8. The power generation system (100, 400) as claimed in claim 3, further comprising a third switching element (134) coupled between the stator winding (122) of the DFIG (104) and the PCC (114), wherein the controller (136) is configured to selectively control switching of the third switching element (134) to connect or disconnect the stator winding (122) from the PCC (114) based at least on the value of the operating parameter.

* * * * *